United States Patent
Ward

(10) Patent No.: US 8,256,800 B2
(45) Date of Patent: Sep. 4, 2012

(54) APPARATUS AND METHOD FOR SUPPORTING A PIPE COUPLING

(75) Inventor: Martin G. Ward, Lakewood, CO (US)

(73) Assignee: Onset Pipe Products, Inc., Lakewood, CO (US)

( * ) Notice: Subject to any disclaimer, the term of this patent is extended or adjusted under 35 U.S.C. 154(b) by 64 days.

(21) Appl. No.: 12/853,117

(22) Filed: Aug. 9, 2010

(65) Prior Publication Data
US 2010/0320757 A1    Dec. 23, 2010

Related U.S. Application Data

(63) Continuation-in-part of application No. 12/105,074, filed on Apr. 17, 2008, now Pat. No. 7,770,941.

(51) Int. Cl.
*F16L 55/00* (2006.01)

(52) U.S. Cl. ............. 285/45; 285/24; 285/236; 285/417

(58) Field of Classification Search .................. 285/419, 285/45, 236, 237, 417, 24; 248/74.1, 74.2, 248/74.3
See application file for complete search history.

(56) References Cited

U.S. PATENT DOCUMENTS

| | | |
|---|---|---|
| 232,432 A | 9/1880 | Allison |
| D32,498 S | 4/1900 | Watson |
| 2,068,648 A | 1/1937 | Kaplan |
| 2,288,904 A | 6/1942 | Hudson |
| 2,784,989 A | 3/1957 | Krupp |
| 2,904,356 A | 9/1959 | Love |
| 2,980,143 A | 4/1961 | Harris |
| 3,030,601 A | 4/1962 | Krebs |
| 3,153,550 A | 10/1964 | Hollett |
| 3,165,324 A | 1/1965 | Zopfi |
| 3,206,229 A | 9/1965 | Kramer |
| 3,211,475 A | 10/1965 | Freed et al. |
| 3,394,952 A | 7/1968 | Garrett |
| 3,479,066 A | 11/1969 | Gittleman |
| 3,527,484 A | 9/1970 | Walkden |
| 3,539,206 A | 11/1970 | Daniels et al. |
| 3,572,773 A | 3/1971 | Read |
| 3,574,354 A | 4/1971 | Mischel |
| 3,586,354 A | 6/1971 | Boscacci |
| 3,692,337 A | 9/1972 | Mischel |
| 3,743,329 A | 7/1973 | Wesel |

(Continued)

FOREIGN PATENT DOCUMENTS

EP           44719 A1    1/1982

OTHER PUBLICATIONS

U.S. Appl. No. 12/425,641, filed Apr. 17, 2009, Office Action mailed Mar. 29, 2011, 12 pages.

(Continued)

*Primary Examiner* — David E Bochna
(74) *Attorney, Agent, or Firm* — Merchant & Gould, P.C.

(57) ABSTRACT

A pipe coupling support having a substantially rigid body with an inner surface formed to mate with at least a portion of the exterior surface of a pipe coupling installed on pipe. In many cases, the exterior surface of the installed pipe coupling will be non-cylindrical. For example, when pipes of differing diameters or pipes manufactured from different materials must be joined with commonly available pliable couplings. In this instance the inner surface of the body of the pipe coupling support may be formed to mate with a majority of or substantially the entire exterior surface of the installed pipe coupling.

13 Claims, 13 Drawing Sheets

U.S. PATENT DOCUMENTS

| | | | |
|---|---|---|---|
| 3,837,685 | A | 9/1974 | Miller |
| 3,851,901 | A | 12/1974 | Sills |
| 4,036,513 | A | 7/1977 | Loftus et al. |
| 4,172,607 | A | 10/1979 | Norton |
| 4,186,948 | A | 2/1980 | Cronk |
| 4,221,407 | A | 9/1980 | Steimle |
| 4,282,743 | A | 8/1981 | Pickett |
| 4,336,959 | A | 6/1982 | Roche |
| 4,340,052 | A | 7/1982 | Dennehey et al. |
| 4,360,227 | A | 11/1982 | Bridges |
| 4,380,348 | A | 4/1983 | Swartz |
| 4,417,755 | A | 11/1983 | Gittleman |
| 4,480,860 | A | 11/1984 | Foresta et al. |
| 4,518,177 | A | 5/1985 | Deakins |
| 4,538,837 | A | 9/1985 | Cronk |
| 4,587,994 | A | 5/1986 | Links et al. |
| 4,611,835 | A | 9/1986 | Gittleman |
| 4,643,465 | A | 2/1987 | Green et al. |
| 4,667,505 | A | 5/1987 | Sharp |
| 4,726,611 | A | 2/1988 | Sauer |
| 4,728,130 | A | 3/1988 | Corzine |
| 4,741,559 | A | 5/1988 | Berghman |
| 4,763,695 | A | 8/1988 | Dooley |
| 4,804,209 | A | 2/1989 | Fischer |
| 4,929,236 | A | 5/1990 | Sampson |
| 4,939,923 | A | 7/1990 | Sharp |
| D309,774 | S | 8/1990 | Lewis |
| 4,966,397 | A | 10/1990 | McKinnon |
| 5,002,314 | A | 3/1991 | Smith |
| D318,321 | S | 7/1991 | Wigle |
| 5,039,137 | A | 8/1991 | Cankovic et al. |
| 5,056,833 | A | 10/1991 | Webb |
| 5,070,597 | A | 12/1991 | Holt et al. |
| 5,190,322 | A | 3/1993 | Hughes |
| 5,193,859 | A | 3/1993 | McKinnon |
| 5,203,594 | A | 4/1993 | Straub |
| 5,370,427 | A | 12/1994 | Hoelle et al. |
| 5,398,976 | A | 3/1995 | Webb |
| 5,430,252 | A | 7/1995 | Petersen |
| 5,480,193 | A | 1/1996 | Echols et al. |
| 5,531,695 | A | 7/1996 | Swisher |
| 5,564,463 | A | 10/1996 | Helmsderfer |
| D383,053 | S | 9/1997 | Schrader et al. |
| D383,378 | S | 9/1997 | Schrader et al. |
| 5,853,200 | A | 12/1998 | Zieres |
| 5,901,739 | A | 5/1999 | Helmsderfer |
| D439,637 | S | 3/2001 | Davies |
| D454,941 | S | 3/2002 | Dietzel |
| D468,002 | S | 12/2002 | Steffan |
| D473,935 | S | 4/2003 | Braun |
| 6,561,552 | B1 | 5/2003 | Berg |
| D486,891 | S | 2/2004 | Cronce |
| 7,066,497 | B2 | 6/2006 | Fullbeck et al. |
| 7,249,787 | B1 | 7/2007 | Chisnell |
| 7,770,941 | B2 | 8/2010 | Ward |
| 7,887,097 | B2 | 2/2011 | Blivet |
| 2003/0184083 | A1 | 10/2003 | Linam et al. |
| 2004/0130148 | A1 | 7/2004 | Patterson et al. |
| 2005/0099005 | A1 | 5/2005 | Fullbeck et al. |
| 2005/0161941 | A1 | 7/2005 | Poll et al. |
| 2007/0222212 | A1 | 9/2007 | Chisnell |
| 2007/0257488 | A1 | 11/2007 | Jimenez |
| 2007/0284037 | A1 | 12/2007 | Buytaert |
| 2009/0261585 | A1 | 10/2009 | Ward |
| 2010/0270790 | A1 | 10/2010 | Ward |

OTHER PUBLICATIONS

U.S. Appl. No. 12/833,190, filed Jul. 9, 2010, Final Office Action mailed Mar. 10, 2011, 11 pages.

Amendment and Response to Non-Final Office Action dated Sep. 18, 2009, cited in U.S. Appl. No. 12/105,074, filed Jan. 19, 2010; 11 pages.

U.S. Appl. No. 12/425,641, filed Apr. 17, 2009, Amendment and Response to non-final Office Action mailed Mar. 29, 2011, dated Jun. 29, 2011, 13 pages.

U.S. Appl. No. 12/833,190, filed Jul. 9, 2010, Amendment and Response to non-final Office Action mailed Sep. 24, 2010, dated Dec. 27, 2010, 13 pages.

U.S. Appl. No. 12/833,190, filed Jul. 9, 2010, Amendment to Final Office Action mailed Mar. 10, 2011, dated Jun. 10, 2011, 11 pages.

Mission Rubber Company, "If we put our name on it—you can depend on It!" Product Catalog, Jun. 2006, 24 pages.

International Search Report and Written Opinion for Application No. PCT/US2009/040837 dated Jun. 16, 2009.

IAPMO R&T, Product Listing Directory, http://pld.iapmo.org/, 1 page.

IAPMO Research and Testing, Inc., Certificate of Listing, Aug. 2009, 2 pages.

USPTO Notice of Allowance dated Apr. 1, 2010, cited in U.S. Appl. No. 12/105,074; 7 pages.

USPTO Non-Final Office Action dated Sep. 18, 2009, cited in U.S. Appl. No. 12/105,074; 12 pages.

USPTO Non-Final Office Action dated Sep. 24, 2010, cited in U.S. Appl. No. 12/833,190; 13 pages.

Amendment and Response to Non-Final Office Action dated Sep. 24, 2010, cited in U.S. Appl. No. 12/833,190, filed Dec. 27, 2010; 13 pages.

USPTO Notice of Allowance dated Nov. 16, 2009, cited in U.S. Appl. No. 29/335,576; 9pgs.

U.S. Appl. No. 12/425,641, Office Action mailed Sep. 29, 2011, 11 pages.

U.S. Appl. No. 12/833,190, Amendment and Response filed Dec. 6, 2011, 10 pgs.

U.S. Appl. No. 12/833,190, Office Action mailed Jul. 6, 2011, 10 pgs.

U.S. Appl. No. 12/425,641, Amendment and Response filed Dec. 29, 2011, 12 pages.

APPARATUS AND METHOD FOR SUPPORTING A PIPE COUPLING

RELATED APPLICATIONS

This application is a continuation-in-part of prior U.S. application Ser. No. 12/105,074, filed on Apr. 17, 2008, which application issued on Aug. 10, 2010, as U.S. Pat. No. 7,770,941, which is hereby incorporated by reference.

TECHNICAL FIELD

An apparatus and method for supporting or reinforcing a pipe coupling installed on pipe.

BACKGROUND

Pipe couplings are often used to couple or join the ends of two lengths of pipe together. Many modern pipe couplings are cylindrical or tubular devices formed of a pliable material such as natural or synthetic rubber. The free ends of the pipes to be coupled are fit into respective sides of the pipe coupling, and generally, one of many types of pipe or hose clamp is used to compress the coupling to the exterior surface of the pipes being joined. Pipe couplings thus serve at least two purposes. The coupling both joins the free ends of two or more pipes together and seals the joint against leakage.

The drain and waste system of most modern construction is fabricated from PVC or CPVC pipe having various suitable diameters. Generally, the interior drain and waste lines will be joined to one or more larger waste lines which passes from the interior to the exterior of the building.

In contrast to the interior drain and waste lines, exterior waste pipes and sewer lines are generally fabricated from clay, cast iron, formed concrete or other non-plastic materials. The pipes used in exterior waste lines often have a somewhat different outside diameter from the waste lines exiting a building. A special pipe coupling may be used to join together two pipes having differing outside diameters or fabricated from different materials.

Element 10 of FIG. 2 is a typical pipe coupling which may be installed between the waste pipe exiting a building and the feeder pipe to an external sewer line. Prior art couplings typically have a flexible or pliable body which is sized to receive the dissimilar pipes at opposite ends. In addition, one or more pipe clamps may be associated with the body to secure and seal the coupling to the respective pipes. Since a typical prior art coupling has a flexible or pliable body the pipe ends can move with respect to each other or separate from each other in response to tension or shear forces which are typically present when the ground around the pipes subsides, a building settles or other forces are applied to the system. Relatively small lateral displacement between the respective pipe ends can cause a failure of the seal and furthermore can cause a pipe edge to be projected into the flow pathway which facilitates blockage at the joint. The inability of a typical flexible coupling to adequately support the joint between waste and sewer pipes or to effectively resist shear and tension forces placed on the pipes is the primary cause of the failure of this joint. Accordingly, a commonplace but expensive repair which is often necessary on the joint between interior waste lines and the exterior sewer system involves excavation of the failed joint, repositioning of the pipes and replacement of the coupling.

Certain types of reinforced couplings are known which may reduce, but typically will not eliminate the problems described above. For example, couplings with a stainless steel support sleeve associated with the pipe clamps are available. Known reinforced designs do not, however, typically provide adequate support to resist the large shear and tension forces applied to pipes when a building or the ground around the joint settles.

Plumbing and sewage contractors may also encase the entire joint in a quantity of concrete. This effectively stabilizes the joint; however, this solution is expensive and renders the joint between the pipes no longer accessible for service needs.

The present invention is directed toward overcoming one or more of the problems discussed above.

SUMMARY OF THE EMBODIMENTS

One embodiment is a pipe coupling support having a substantially rigid body with an inner surface formed to mate with at least a portion of the exterior surface of a pipe coupling installed on pipe. In many cases, the exterior surface of the installed pipe coupling will be non-cylindrical. For example, when pipes of differing diameters or pipes manufactured from different materials must be joined with commonly available pliable couplings. In this instance the inner surface of the body of the pipe coupling support may be formed to mate with a majority of or substantially the entire exterior surface of the installed pipe coupling.

The pipe coupling support may feature at least one recess in the body which is configured to receive a clamp or other structure associated with the installed pipe coupling. By effectively accommodating pipe clamp bolts or other structures in the recess, the pipe coupling support may otherwise more closely mate with the exterior surface of the installed pipe coupling. The support may also include apparatus for compressing or tightening the body into close engagement with the installed pipe coupling. This apparatus can include but is not limited to one or more pipe or hose clamps, bolts, screws, or other threaded members associated with the pipe coupling support body. The pipe coupling support may also include one or more inner supports associated with the inner surface of the body to closely mate with and further support the exterior surface of the installed pipe coupling or the pipe itself adjacent to the coupling.

Another embodiment is a pipe coupling having a substantially rigid body with an inner surface as described above. This embodiment may also include a support sleeve which is configured to fit between the rigid body and the exterior surface of a pipe coupling installed on pipe. In this embodiment, the support sleeve itself may define at least one recess configured to receive a clamp structure such as a tightening bolt associated with the installed pipe coupling. In installations where the exterior surface of the installed pipe coupling is non-cylindrical, the exterior surface of the support sleeve and a portion of the pipe coupling may define a substantially cylindrical surface when the support sleeve is operatively associated with the installed pipe coupling. The support sleeve may be rigid or pliable.

Another embodiment is a pipe coupling having a substantially rigid body and a pliable inner member. The pliable inner member may include a first cylindrical inner surface sized to mate with the outer surface of a first pipe having a first outside diameter. The pliable inner member may also have a second cylindrical inner surface sized to mate with the outer surface of a second pipe having a second outside diameter, which is less than the diameter of the first pipe. The pliable inner member may also have a junction surface between the first and second cylindrical surfaces which is substantially perpendicular to both the first and second cylindrical inner surfaces. This embodiment may also include apparatus such as one or more pipe clamps or bolts associated with the body for compressing or tightening the body and inner member into close engagement with the free ends of first and second pipes. When operatively installed the pipe coupling and inner member are configured such that the junction surface abuts the free end of the first pipe.

Yet another embodiment is as pipe coupling support designed to fit an installed pipe coupling used to connect a first and a second pipe having the same exterior diameters. The pipe coupling support may further include a notch designed to fit connection materials such as a worm drive.

Another embodiment is a method of supporting a pipe coupling installed on pipe. The method includes providing a pipe coupling support of any type as described above and associating the pipe coupling support with an installed pipe coupling such that the inner surface of the support body is closely engaged with the exterior surface of the installed pipe coupling.

The method may also include compressing or tightening the pipe coupling support into close engagement with the installed pipe coupling. Compression may occur with pipe clamps, bolts associated with the body, or other tightening means. The method may also include receiving clamp structures such as bolts which are associated with the installed pipe coupling into recesses associated with the pipe coupling support to maximize the engagement area between the pipe coupling support and installed pipe coupling.

DETAILED DESCRIPTION

Figure 1:
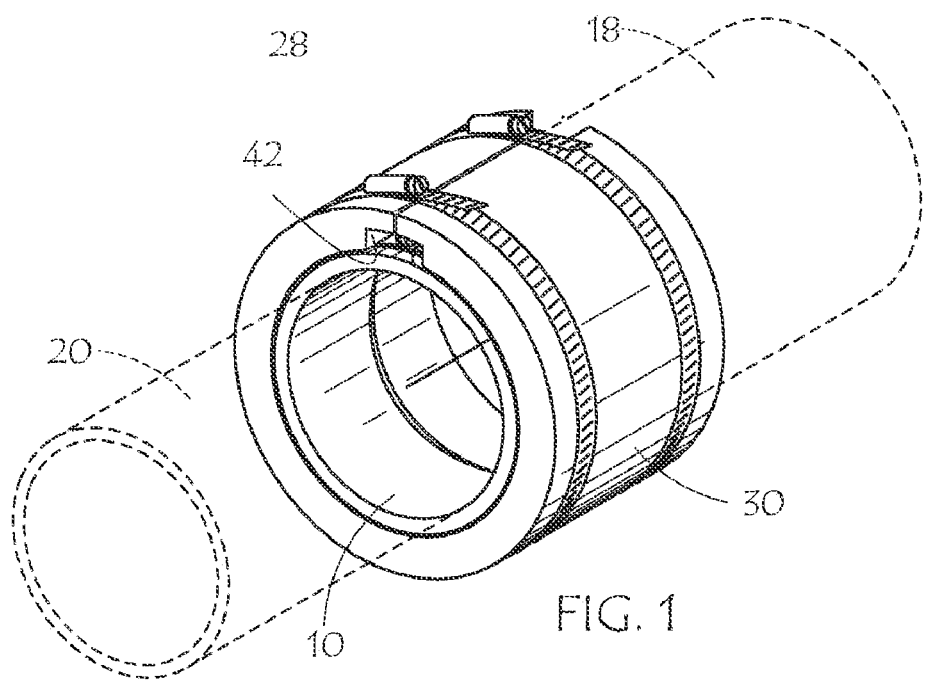
FIG. 1 is a perspective view of a pipe coupling support.
Figure 2:
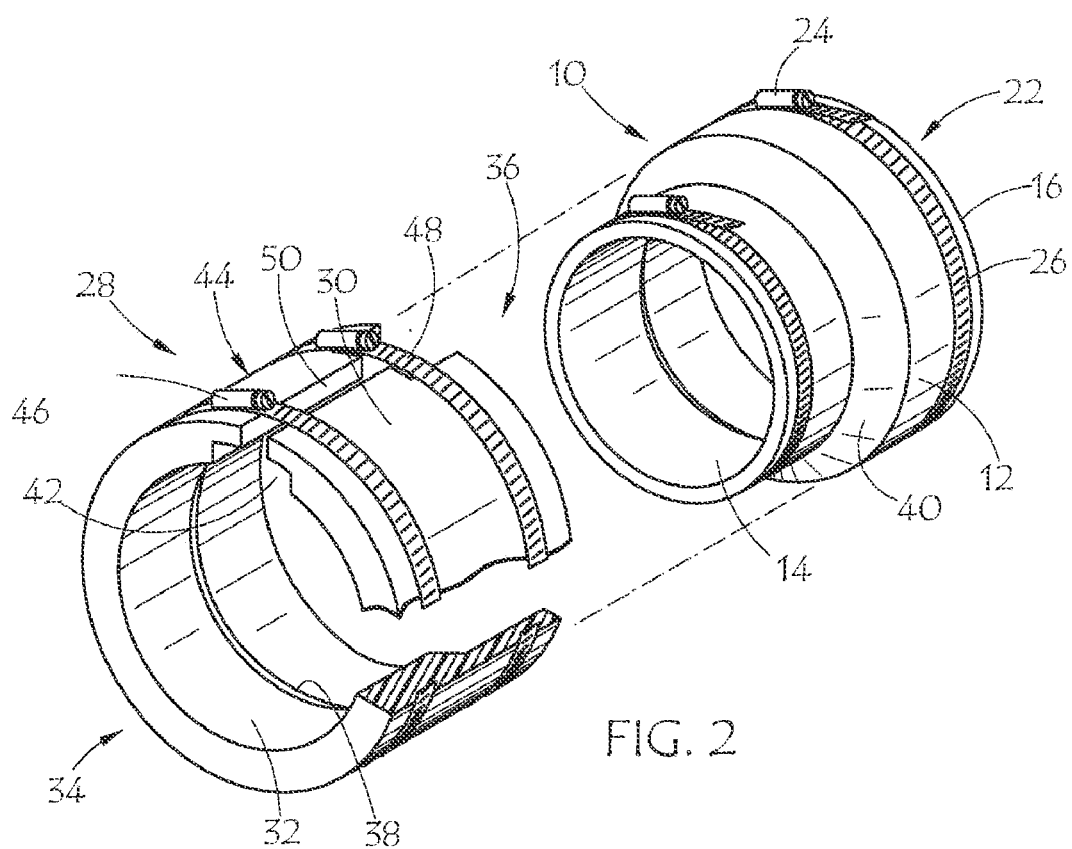
FIG. 2 is an exploded perspective view of the pipe coupling support of FIG. 1

Various embodiments of pipe coupling supports are disclosed herein which may be used to support and reinforce an existing, new or previously installed pipe coupling. A typical pipe coupling 10 is illustrated in FIG. 1 and FIG. 2. The pipe coupling 10 includes a sleeve 12 which is typically molded from a pliable substance such as natural or synthetic rubber. The sleeve 12 has a first opening 14 and a second opening 16 at opposite ends. The first and second openings are appropriately sized to receive the free ends of the pipes which are to be joined with the coupling 10. As is best shown in FIG. 2, the first opening 14 and second opening 16 may define openings of different diameter. Thus, the first opening 14 and second opening 16 may be formed to receive and seal with a first pipe 18 and second pipe 20 (see phantom outline FIG. 1) which have different diameters and may also be fabricated from different materials.

The pipe coupling 10 as described above is therefore suitable for joining and sealing the typically plastic pipe which passes to the exterior of a building from the building's drain and waste system with an exterior pipe connected to a sewer or septic system. The sewer or septic system pipe is often fabricated from a non-plastic material such as clay, cast iron or concrete.

The pipe coupling 10 also has one or more pipe clamps 22 associated with the sleeve 12. The pipe clamp 22 as shown in FIG. 2 includes a worm drive bolt 24 engaged with a typically stainless steel strap 26 such that rotation of the worm drive bolt 24 causes compression of the first or second opening 14, 16 respectively. Thus, the pipe clamp 22 may be used to assure that the coupling 10 is securely bound to and sealed with pipes 18 and 20.

The sleeve 12 is typically fabricated from a pliable material such as natural or synthetic rubber. Thus, the sleeve itself provides only moderate resistance to lateral displacement of the pipe ends as a result of shear forces which might result when the associated building or backfill settles. Similarly, the pliable sleeve 12 provides only moderate resistance to linear displacement of the free ends of the pipes 18 and 20 upon the application of tension forces such as might occur when backfill subsides along a length of pipe. Accordingly, the pipe coupling 10 provides only moderate protection against failure of the joint upon the application or force or stress to either pipe 18 or pipe 20.

One embodiment of a pipe coupling support 28 is illustrated in FIG. 1 and FIG. 2. This embodiment of a pipe coupling support 28 includes a substantially rigid body 30 which has an inner surface 32 which is formed to mate as closely as possible with the exterior surface of a pipe coupling 10 installed on pipe. The pipe coupling support body 30 may be fabricated from plastic, metal, concrete, a ceramic material or other substance having suitable rigidity to support an installed pipe coupling 10.

Many typical pipe couplings 10 have a non-cylindrical external profile since the sleeve 12 has a substantially uniform thickness throughout the coupling 10 but the first and second openings 14, 16 are of different sizes to accommodate dissimilar pipes. As shown in FIG. 2, the inner surface 32 of the rigid body 30 of a pipe coupling support 28 may be formed to mate with a majority of or substantially the entire exterior surface of the installed pipe coupling 10. Thus, the inner surface 32 may have a relatively smaller opening 34 and a relatively larger opening 36 at opposite ends of the body 30 to correspond with the differentially sized first and second openings 14, 16. In addition, the transition 38 between the smaller opening 34 and large opening 36 of the body 30 may be sloped at an appropriate angle or otherwise formed to closely mate with the sloped portion 40 of the sleeve 12 between the respective openings.

Close engagement of the pipe coupling support 28 with the coupling 10 may be further enhanced by providing the body 30 with one or more recesses 42 defined by the body 30 and positioned to receive protruding structures such as the worm drive 24 of the coupling 10. The operative configuration of a recess 42 receiving a worm drive 24 is best shown in FIG. 1.

As shown in FIG. 1 and FIG. 2, this embodiment of the pipe coupling support 28 may include an apparatus for compressing or tightening the body 30 into close engagement with the installed pipe coupling 10. This apparatus may (as is shown in FIGS. 1 and 2) be one or more conventional pipe clamps operatively associated with the substantially rigid body 30. The pipe clamps 44 may include a worm drive 46 and strap 48 such that tightening the bolt associated with the worm drive 46 causes the strap 48 to compress the body 30. Compression may occur at slot 50. Alternatively, another type of compression zone or a pliable portion may be added to the body 30 to facilitate radial compression.

Figure 3:
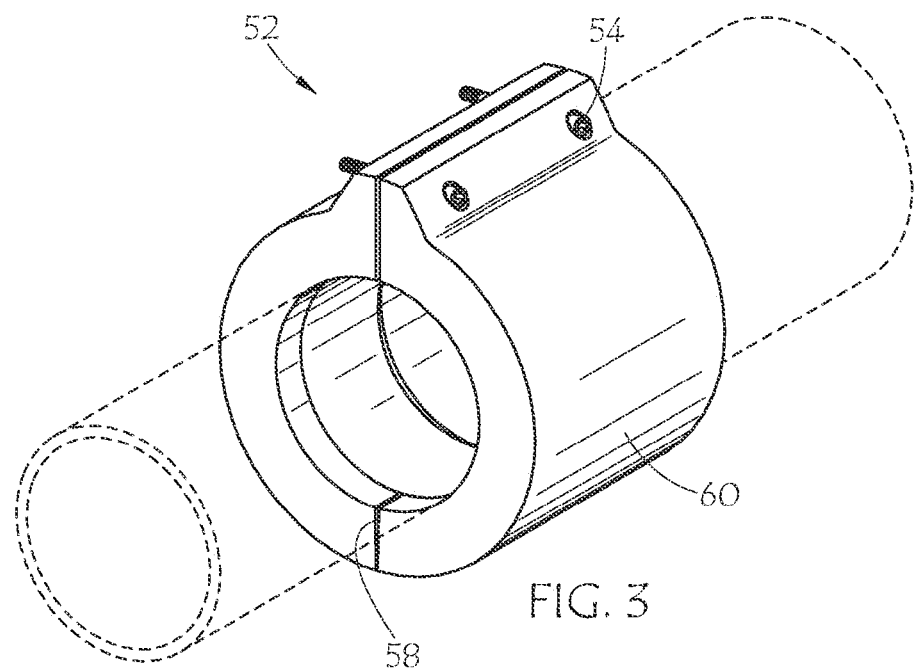
FIG. 3 is a perspective view of an alternative embodiment of a pipe coupling support.
Figure 4:
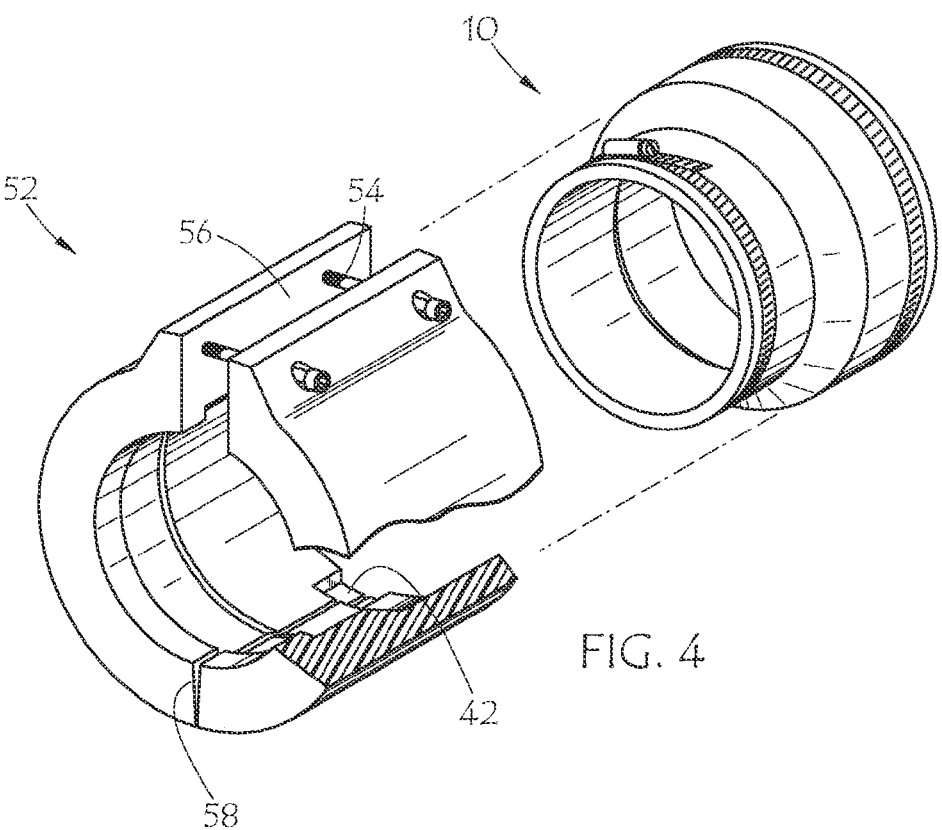
FIG. 4 is an exploded perspective view of the pipe coupling support of FIG. 3.

Other types of apparatus may be used to assure that the pipe coupling support may be compressed or tightened into close engagement with the installed pipe coupling 10. For example, as is illustrated in FIGS. 3 and 4 an alternatively configured pipe coupling support 52 which is otherwise structurally similar to the embodiment described above may be tightened into close engagement with an installed pipe coupling 10 with one or more threaded bolts 54 associated with a slot 56. The pipe coupling support 52 of FIGS. 3 and 4 also features a hinge 58 which may be a supplemental structure or living hinge molded into the body 60. The hinge facilitates the wide opening of the pipe coupling support 52 for placement over a pipe coupling 10.

Figure 5:
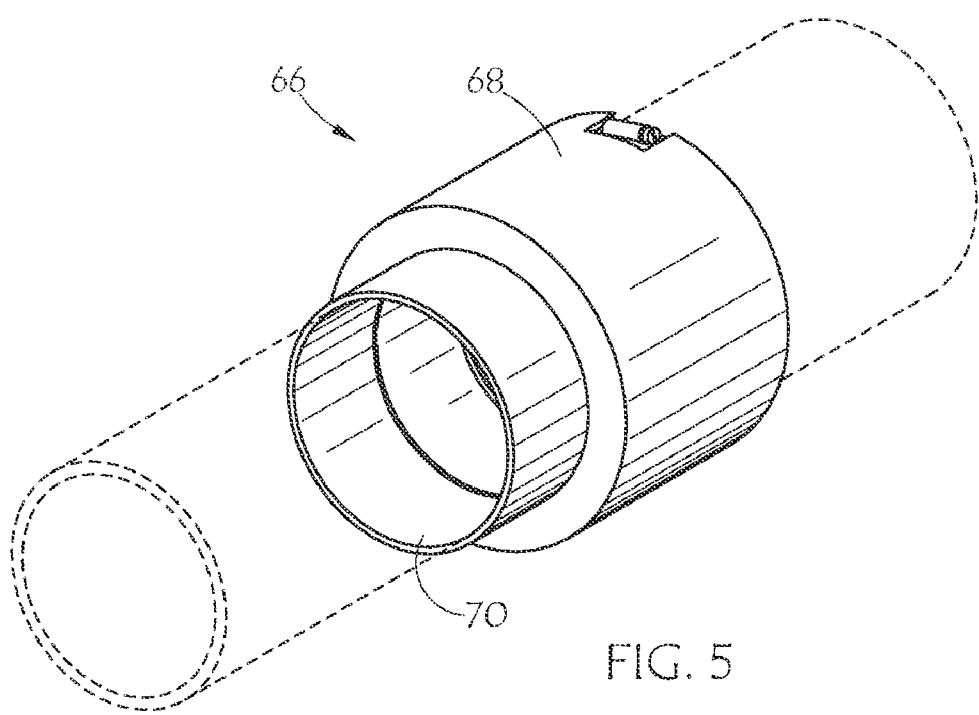
FIG. 5 is a perspective view of a pipe coupling support without compression apparatus.
Figure 6:
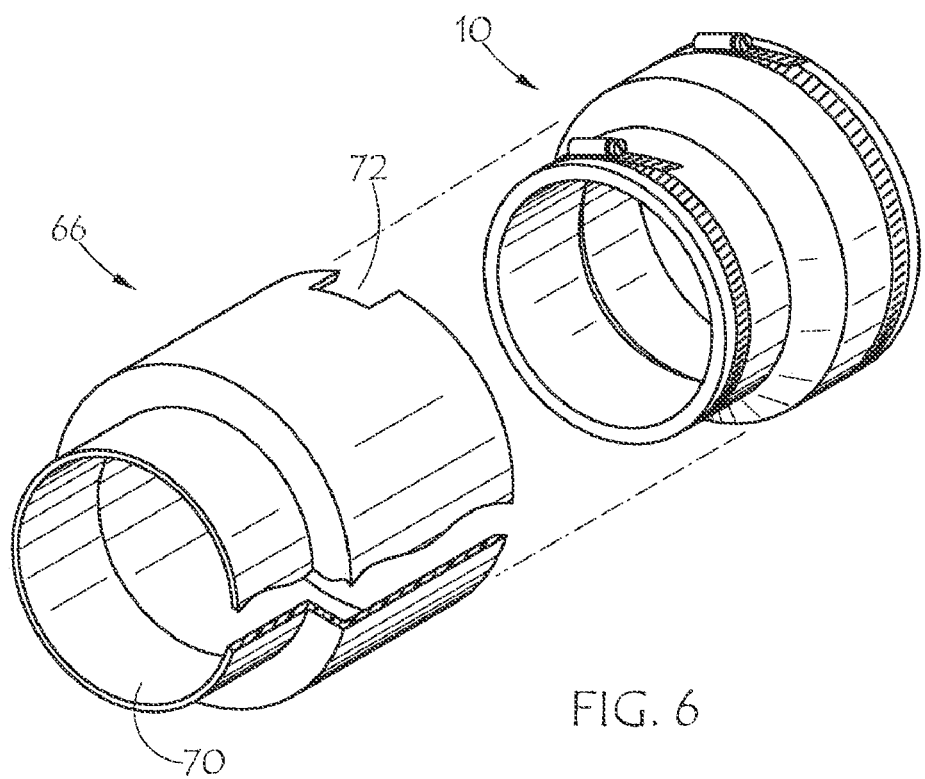
FIG. 6 is an exploded perspective view of the pipe coupling support of FIG. 5.

Separate apparatus for tightening the body 60 into close engagement with the installed pipe coupling 10 may not, in certain instances, be desired or necessary. For example, an alternative pipe coupling support 66 as illustrated in FIGS. 5 and 6 may include a body 68 which has an inner surface 70 and one or more recesses 72 configured to slide into close mating engagement with an installed pipe coupling 10.

Figure 7:
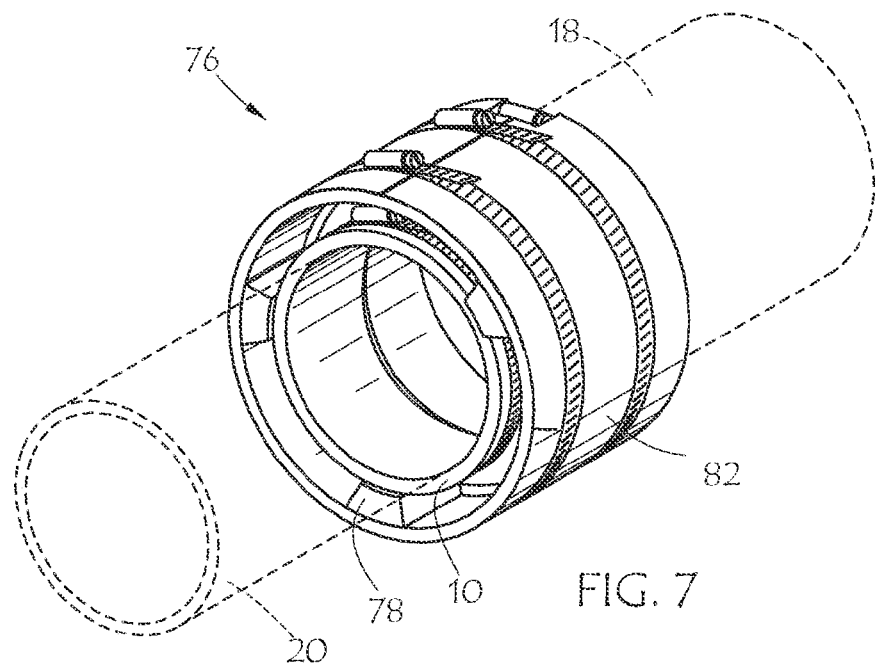
FIG. 7 is a perspective view of a pipe coupling support including inner supports.
Figure 8:
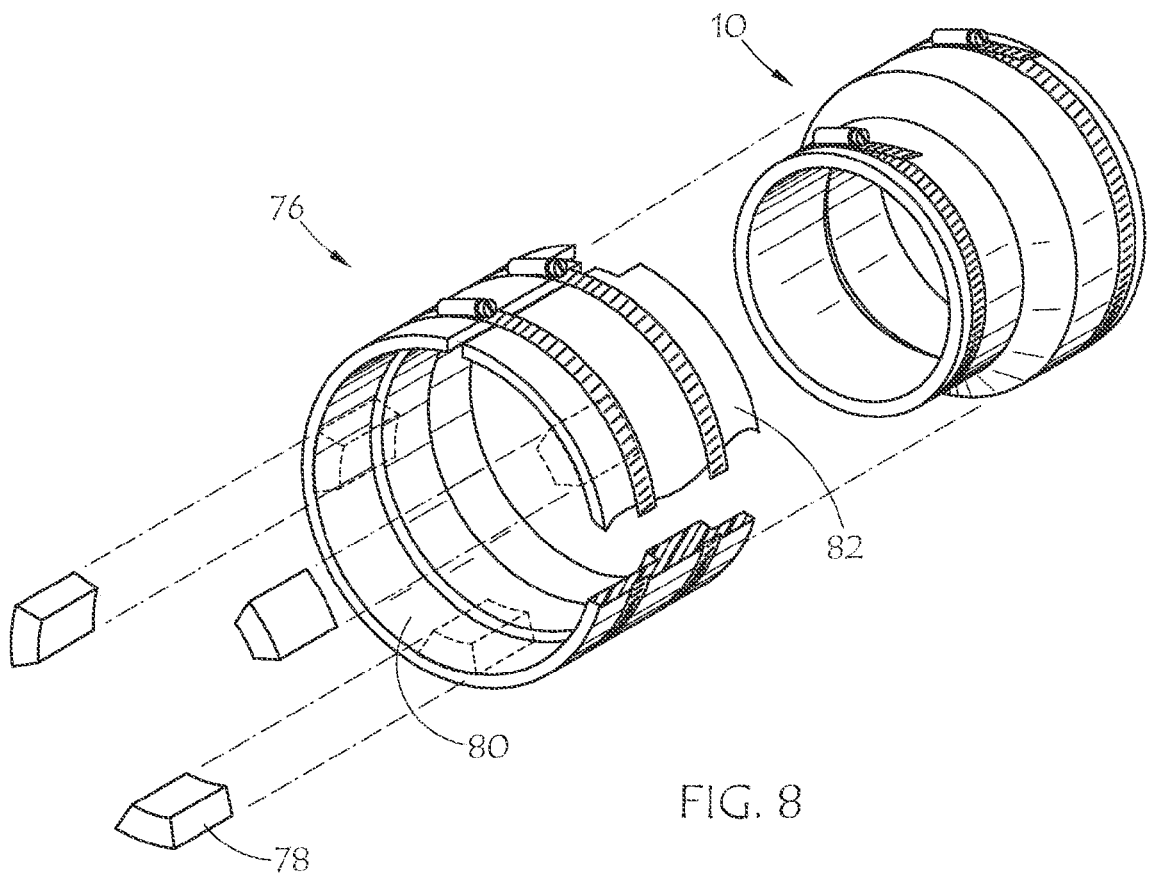
FIG. 8 is an exploded perspective view of the pipe coupling support of FIG. 7.

A pipe coupling support 76 as shown in FIGS. 7 and 8 may be fabricated with one or more inner supports 78 operatively positioned between the inner surface 80 of the body 82 and a portion of the exterior surface of an installed pipe coupling 10. Thus, the inner support 78 may provide additional support and minimize the need to fabricate a body with a variable inner profile. Alternatively, the body 82 of the pipe coupling support 76 could be sized to extend beyond the ends of the pipe coupling 10 and one or several inner supports 78 could mate and support directly with a first or second pipe 18, 20. The inner supports 78 can be of any shape and fabricated from a pliable or rigid material. The inner supports 78 may be separate structures or formed as extensions of the body 82.

Figure 9:
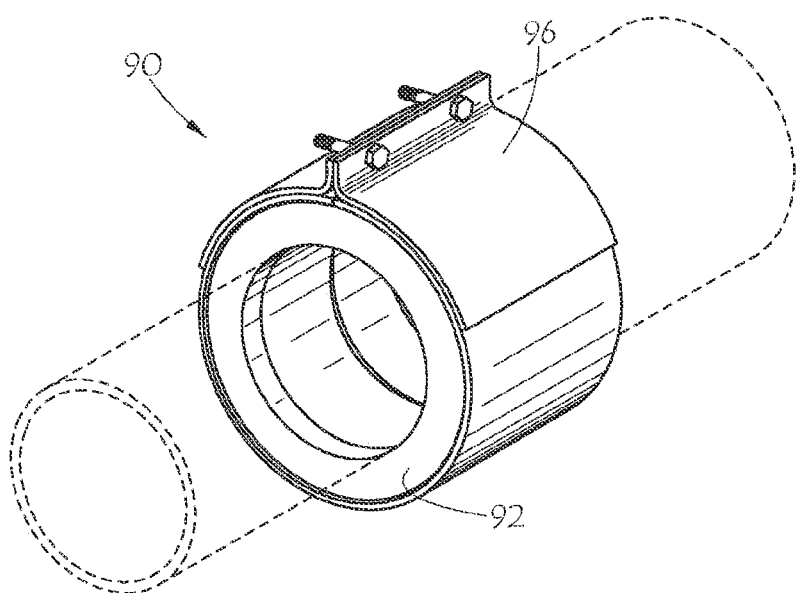
FIG. 9 is a perspective view of a pipe coupling support including a support sleeve.
Figure 10:
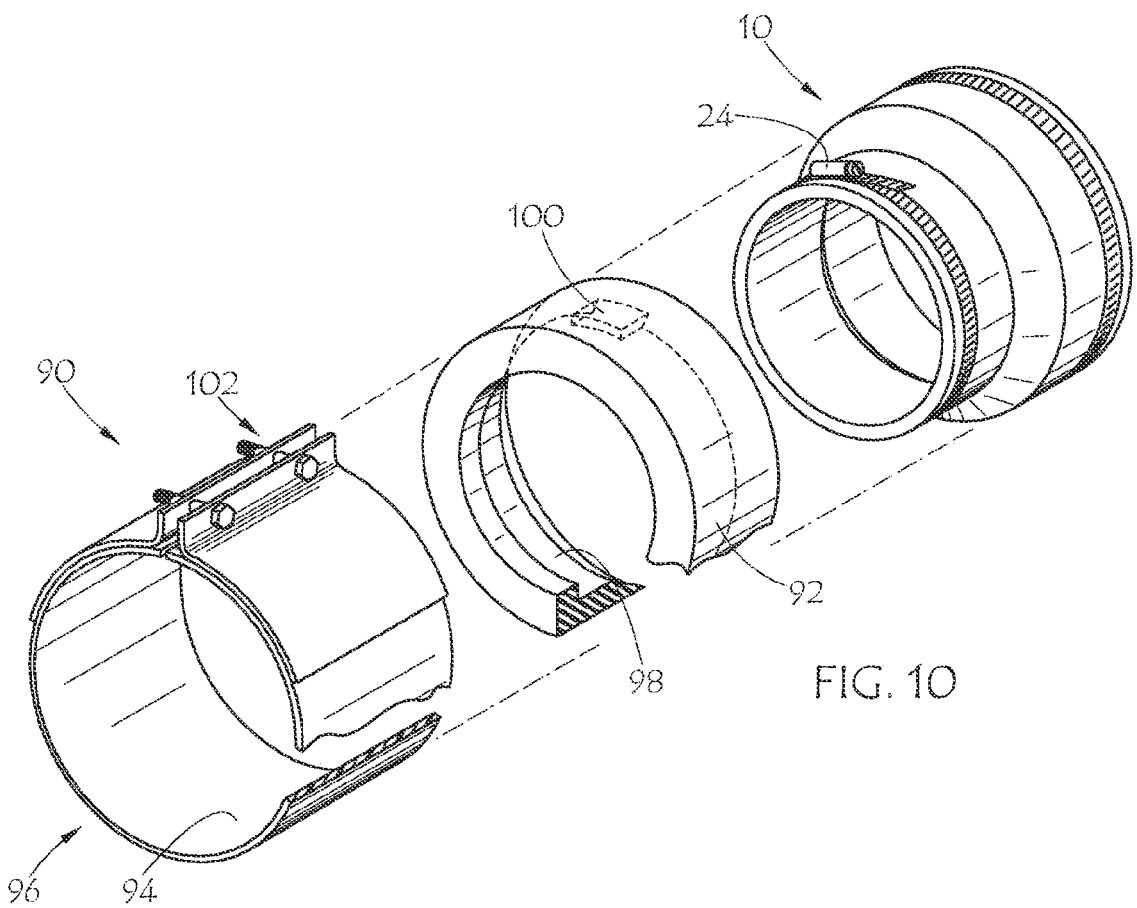
FIG. 10 is an exploded perspective view of the pipe coupling support of FIG. 9.

In each of the embodiments described above, the substantially rigid body of the pipe coupling support either directly, or in association with inner supports, is closely engaged with the pipe coupling 10 when the pipe coupling support is positioned for use. In an embodiment of a pipe coupling support 90 as shown in FIGS. 9 and 10 a support sleeve 92 may be operatively positioned between an inner surface 94 of the substantially rigid body 96 and an installed pipe coupling 10. The support sleeve 92 may have an inner support surface 98 which is formed to mate with an exterior surface of the pipe coupling 10. The support sleeve may also define one or more recesses 100 configured to receive worm drive 24 or other structure associated with the pipe coupling 10.

The body 96 of this embodiment of the pipe coupling support 90 may include an apparatus for compressing or tightening the body and support sleeve into close engagement with the pipe coupling 10. This apparatus may be a pipe clamp as described above, a bolt and slot apparatus 102 as shown on FIGS. 9 and 10, or another apparatus suitable for radially compressing the body 96.

As described above, a typical pipe coupling 10 for joining dissimilar pipes will not have a straight walled cylindrical external profile. Accordingly, many embodiments of a pipe coupling support as described herein feature an inner surface specifically formed to mate with the irregular exterior surface of the pipe coupling. As shown in FIGS. 9 and 10, the support sleeve 92 may be sized such that the exterior surface of the support sleeve and a portion of the exterior surface of the installed pipe coupling 10 form a substantially straight walled cylindrical combined surface when the support sleeve 92 is operatively associated with the installed pipe coupling. Thus, the inner surface of the body 96 may be fabricated with substantially straight cylindrical sides. This configuration facilitates fabrication of the body 96 from rolled sheet stock or readily available rigid pipe sections and in certain instances may eliminate molding or machining steps which might be necessary with other embodiments to ensure that the inner surface of the body closely mates with the exterior surface of a pipe coupling.

Figure 11:
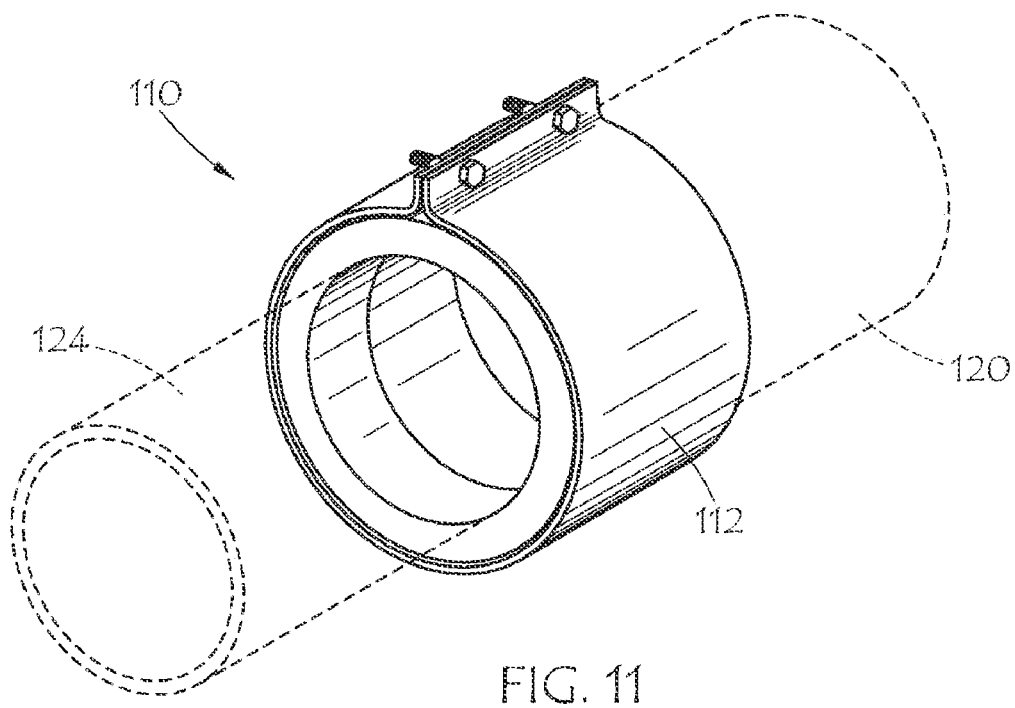
FIG. 11 is a perspective view of a pipe coupling having a pliable inner member with a junction surface.
Figure 12:
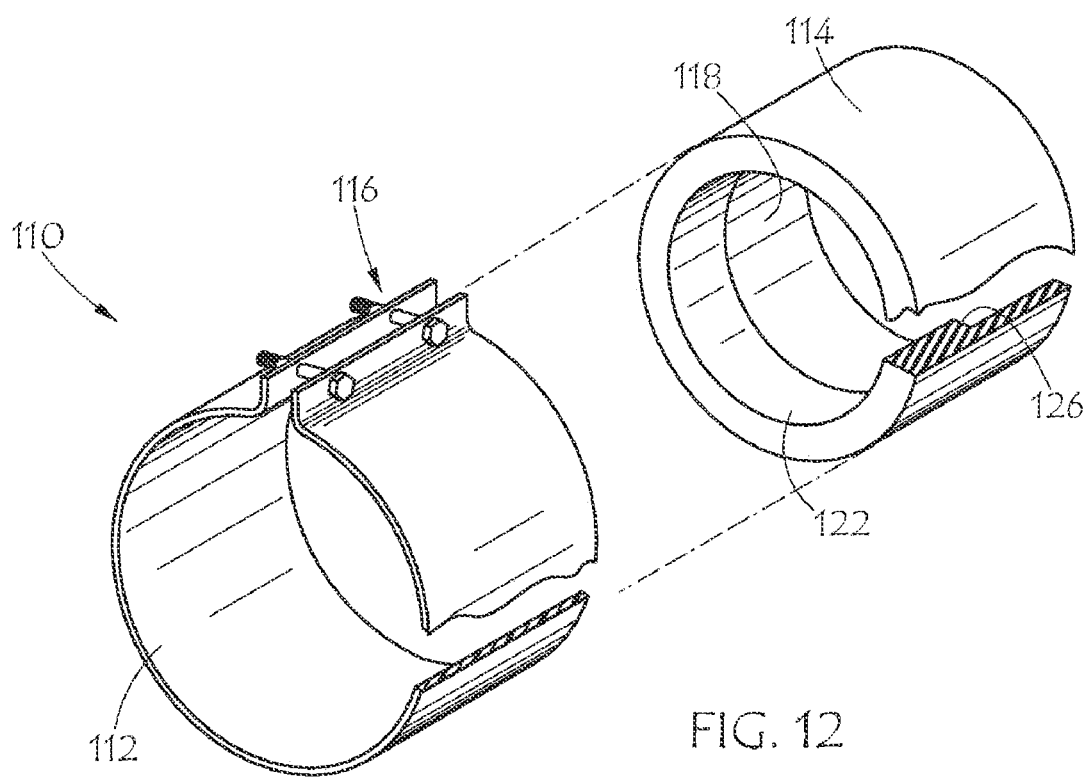
FIG. 12 is an exploded perspective view of the pipe coupling of FIG. 11.

FIGS. 11 and 12 illustrate a novel pipe coupling 110. The pipe coupling 110 includes a substantially rigid body 112 and a pliable inner member 114. The body 112 may optionally include compression apparatus such as one or more pipe clamps or the bolt, slot and flange apparatus 116 illustrated in FIGS. 11 and 12. The coupling 110 could alternatively be implemented with other types of compression apparatus or no compression apparatus at all.

The pliable inner member 114 includes a first cylindrical inner surface 118 sized to mate with the outer surface of a first pipe 120 having a first diameter. The pliable inner member 114 also has a second cylindrical inner surface 122 sized to mate with an outer surface of a second pipe 124 having a second diameter which is less than the diameter of the first pipe 120.

A junction surface 126 is the transition between the first cylindrical inner surface 118 and the second cylindrical inner surface 122. The junction surface 126 is substantially perpendicular to both the first and second cylindrical inner surfaces. Thus, when the coupling 110 is placed into engagement with a free end of the first pipe 120 the free end closely abuts the junction surface assuming the free end of the first pipe 120 is cut in a reasonably square manner.

Figure 13:
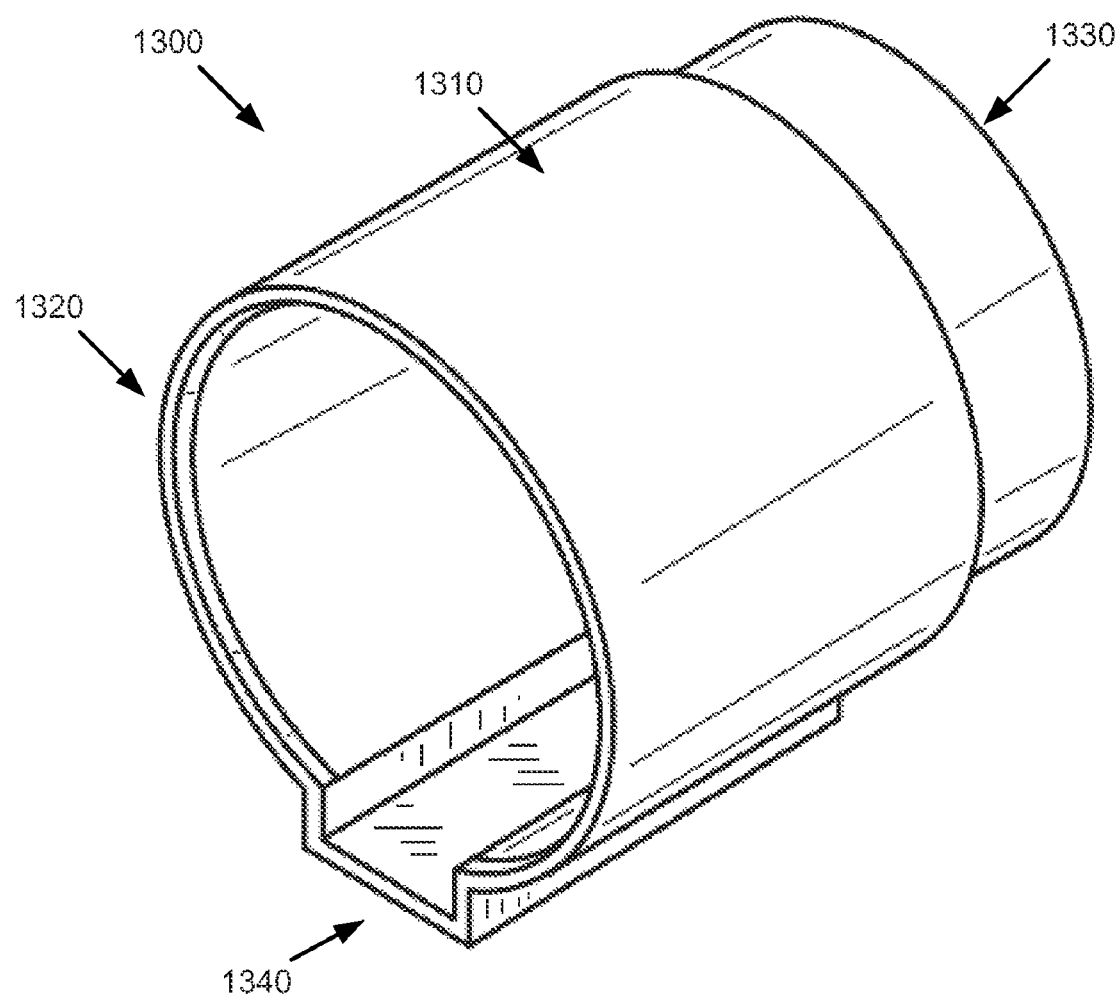
FIG. 13 is a perspective view of an embodiment of a pipe coupling having two openings of the same diameter.

FIG. 13 is a perspective view of an embodiment of a pipe coupling support 1300. In embodiments, the pipe coupling support 1300 includes a body 1310 with a first opening 1320 and a second opening 1330 having interior diameters designed to fit pipes having similar exterior diameters. As illustrated in FIG. 13, the first opening may be notched in order to fit over pipes joined together by one or more hose clamps having worm drive bolts. In embodiments, pipe coupling support 1300 may be used to provide support for the joining of two pipes having similar outside diameters. In embodiments, the body 1310 may be fabricated from a rigid material such as, but not limited to, Polyvinyl chloride ("PVC") or acrylonitrile butadiene styrene ("ABS") material. In further embodiments, the rigid material may be any type of plastic, metal, concrete, and/or ceramic material. In other embodiments, the body 1310 may be composed of a pliable material.

In embodiments, the first opening 1320 and the second opening 1330 may be designed to fit a specific type of pipe or a specific pipe size. For example, the pipe coupling support 1300 may be designed to support PVC pipes used for sewage purposes. PVC pipes used for sewage purposes generally come in three types, SDR 26, SDR 35, and SCH 40. For example, 4" nominal SDR 26 and SDR 35 pipes generally have an exterior diameter of 4⅜" plus or minus ¹⁄₆₄" (it is recognized by one in the art that pipe sizes are nominal and certain variation occurs so that no two pipes have exactly the same dimensions even though such pipes are substantially the same in size). On the other hand, 4" nominal SCH 40 pipes generally have an exterior diameter of 4½". In such embodiments, the first opening 1320 is sized to receive the selected pipe's exterior diameter when the support sleeve is installed (that is, the first opening will accept the anticipated exterior diameter of the support sleeve when the support sleeve is installed on the selected pipe) while the second opening 1330 is sized to fit the selected pipe's exterior diameter. In other embodiments, the first opening 1320 and the second opening 1330 may have a "one size fits all" design in which the pipe coupling support 1300 is designed with openings large enough to fit many different types of pipe sizes. In such embodiments, the pipe coupling support 1300 may be used with inner supports, such as the inner supports 78 described with respect to FIGS. 7 and 8. While the forgoing examples provide specific materials and sizes of pipes, one of skill in the art will appreciate that embodiments of the present disclosure may be practiced with any pipe regardless of its type or size.

While the embodiments of pipe coupling support 1300 have been described in a manner such that the first opening 1320 and the second opening 1330 have different interior diameters, one designed to fit a pipe of a first exterior diameter and one designed to fit a pipe of the same exterior diameter with the support sleeve attached, in an alternative embodiment the openings 1320 and 1330 are the same size and designed to fit pipes having similar exterior diameters. One of skill in the art will appreciate that the present disclosure contemplates various differences in the size of the interior diameters of the openings of pipe coupling support 1300 to support different types of additional support structures.

In embodiments, the body 1310 and the first opening 1330 includes a notch 1340. The notch 1340 is included to provide space within the body 1330 of the pipe coupling support 1300 to accommodate the use of one or more worm drives of hose clamps that may be used to secure the connection between a first and a second pipe. For example, a first pipe and a second pipe may be connected using a support sleeve. The connection may be secured by tightening one or more hose clamps around the exterior of the pipes and support sleeve to secure the connection. While this specific embodiment has been described with respect to securing pipes using a support sleeve and hose clamps with worm drives, one of skill in the art will recognize that any number of methods or mechanisms of connecting pipes can be practiced with the embodiments of the pipe coupling support 1300 disclosed herein.

Figure 14:
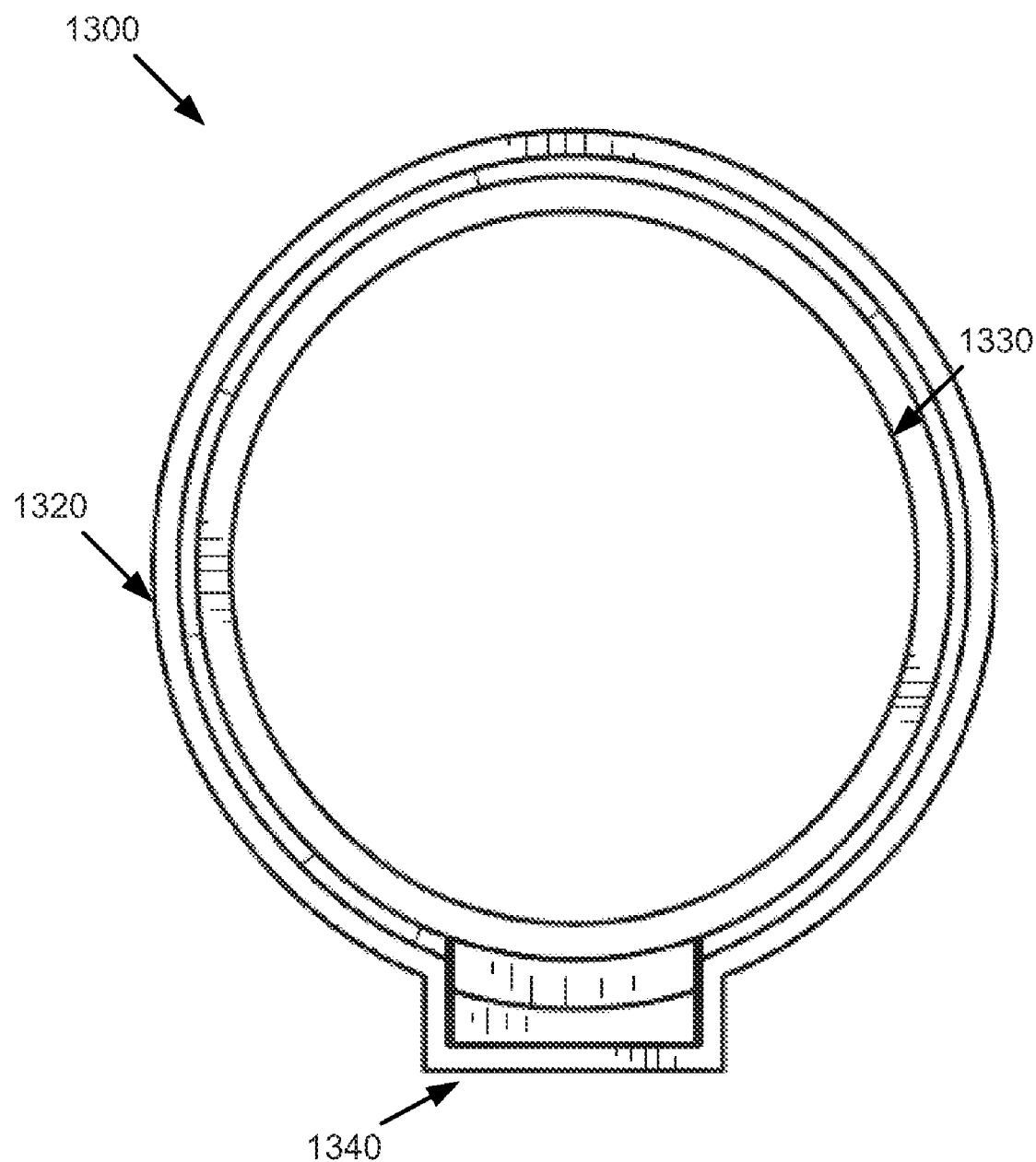
FIG. 14 is a top view of an embodiment of a pipe coupling support.

FIG. 14 is a top view of an embodiment of a pipe coupling, such as pipe coupling support 1300. As described with respect to FIG. 13, in embodiments the pipe coupling support 1300 has a body 1310, a first opening 1320, and a second opening 1330. In embodiments, the first opening 1320 may have an interior diameter that is larger than the interior diameter of the second opening 1330, even though the pipe coupling support 1300 may be designed to fit pipes having the same exterior diameter. As previously described, the slightly larger diameter allows for additional connection materials to fit within the pipe coupling support 1300. The view illustrated in FIG. 14 also shows notch 1340, which provides extra volume within pipe coupling support 1300 to allow for additional connection materials, such as compression devices (e.g., worm drives), or other materials and/or apparatuses that may be used to connect a first and second pipe.

Figure 15:
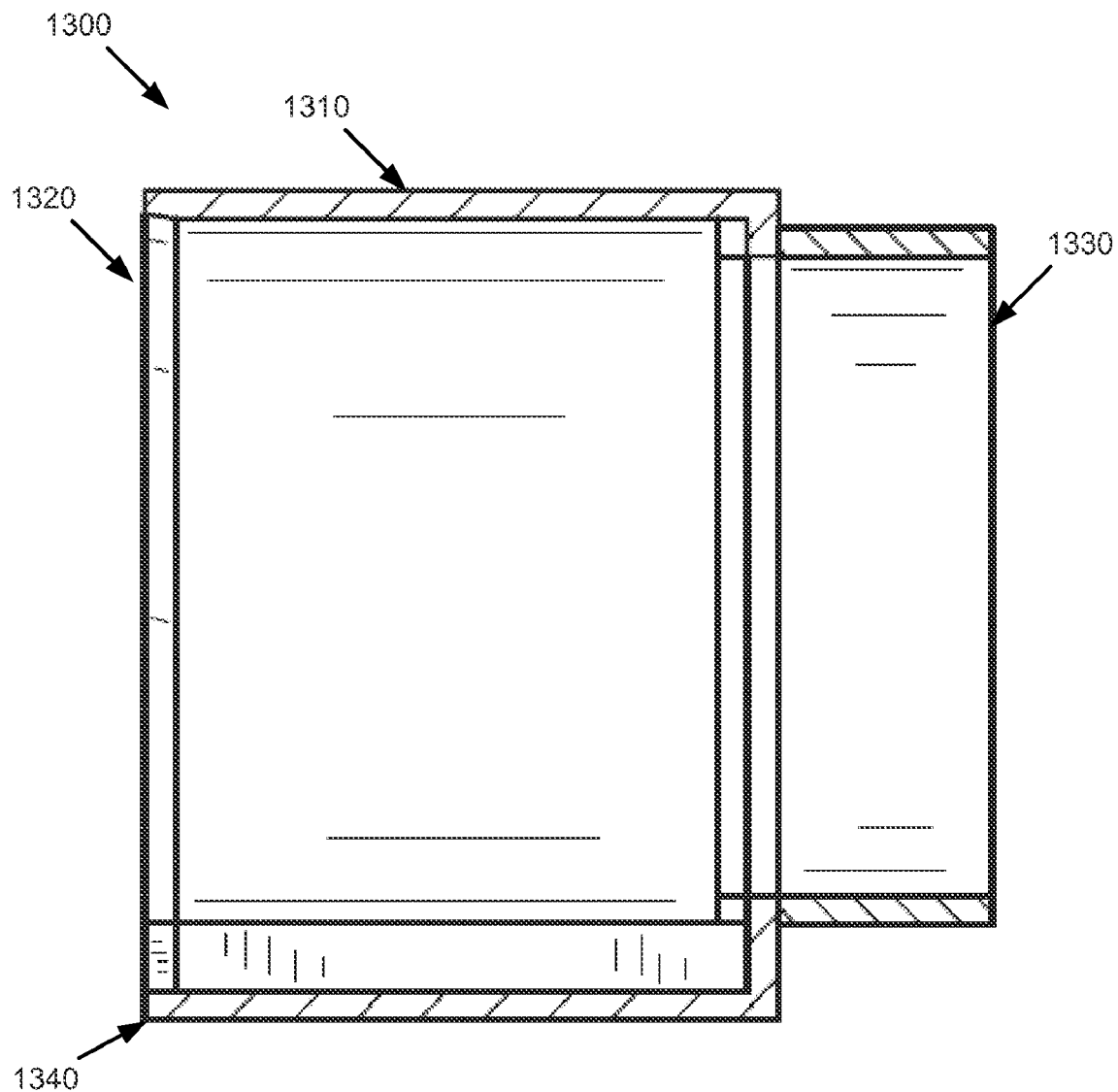
FIG. 15 is a left side view of an embodiment of a pipe coupling support.
Figure 16:
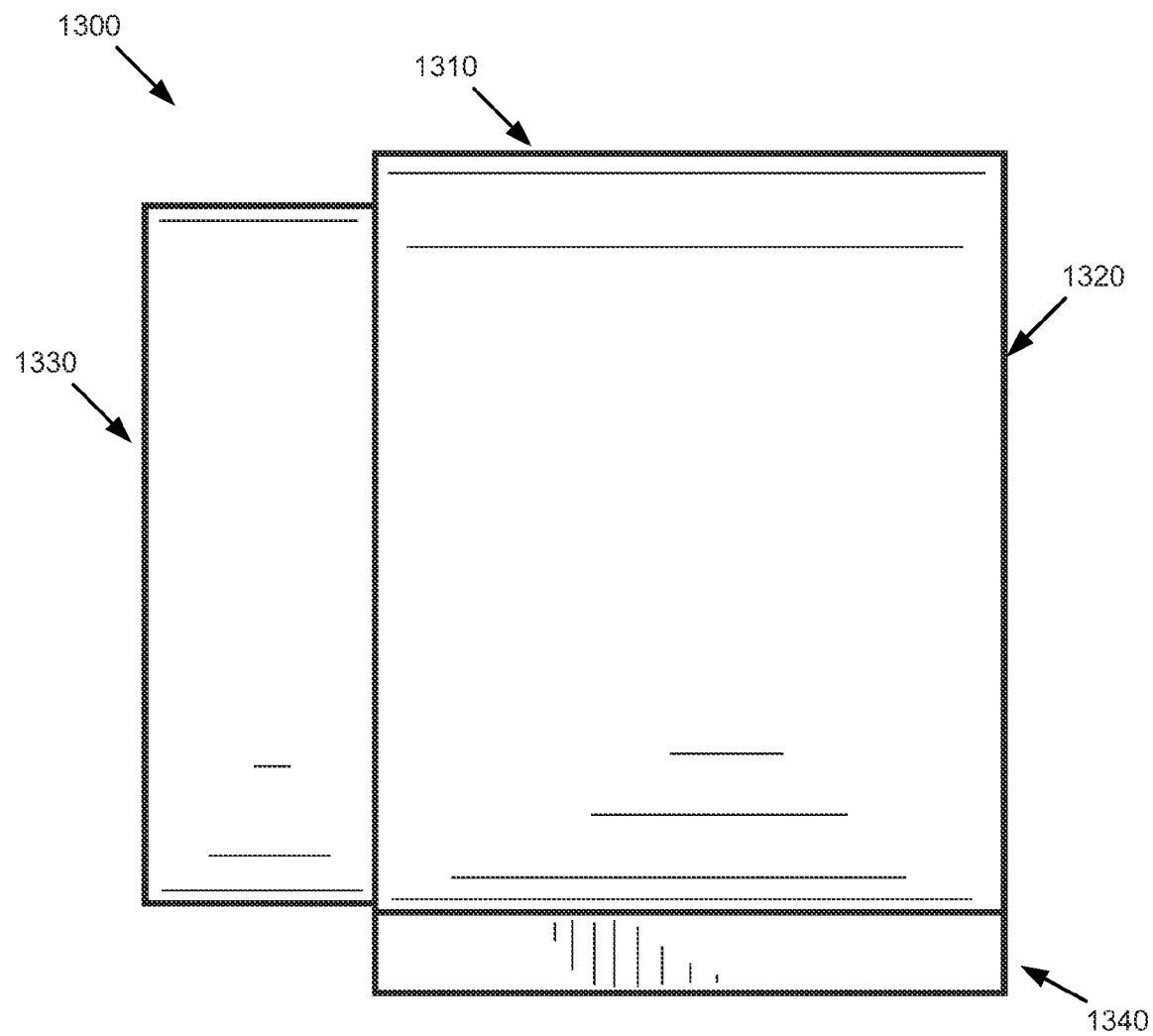
FIG. 16 is a right side view of an embodiment of a pipe coupling support.
Figure 17:
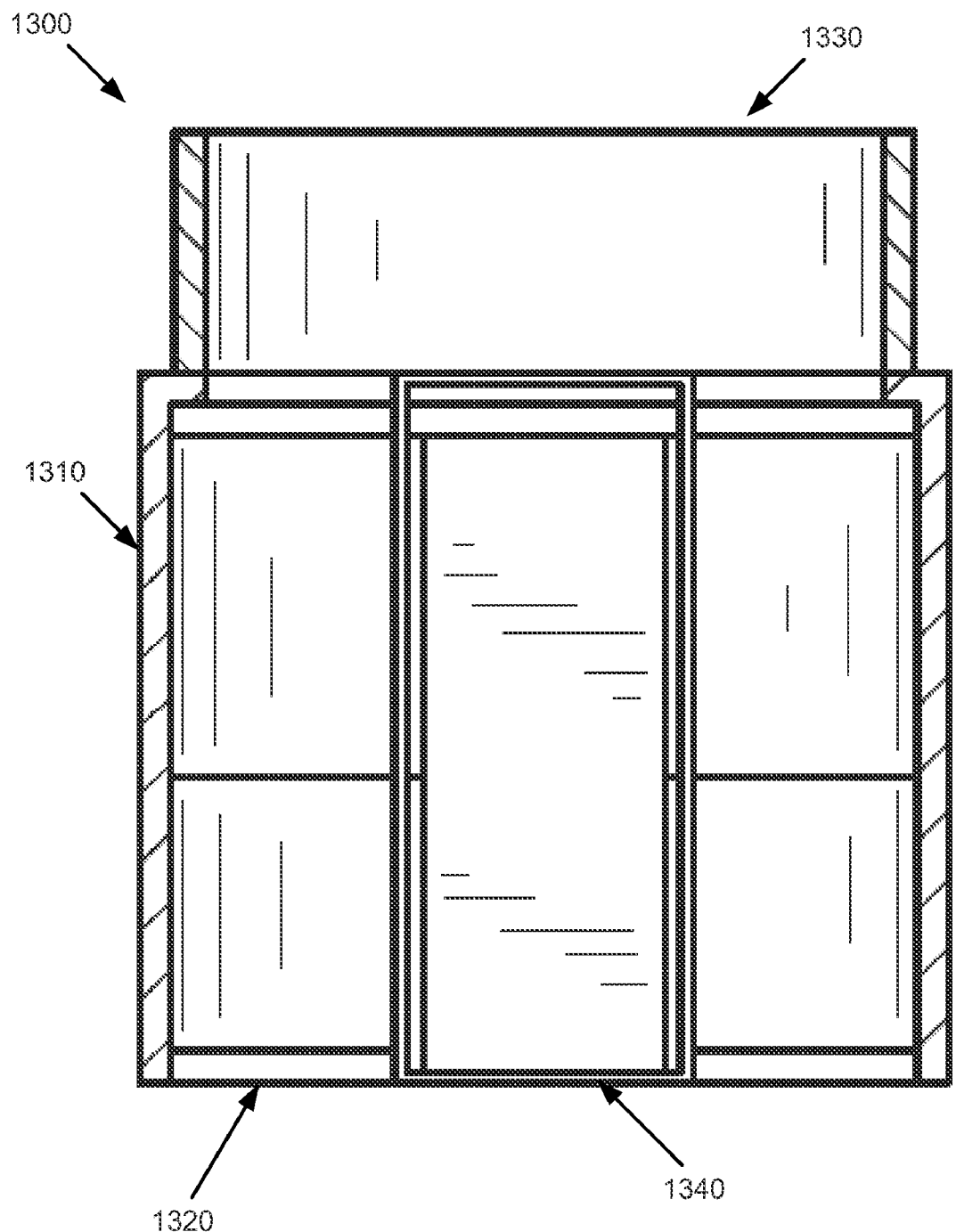
FIG. 17 is a front view of an embodiment of a pipe coupling support.

FIGS. 15-17 are illustrations of various different views of embodiments of the pipe coupling support 1300. FIG. 15 is an illustration of a left side view of an embodiment of pipe coupling support 1300. FIG. 16 is an illustration of a right side view of an embodiment of pipe coupling support 1300. FIG. 17 is an illustration of a front side view of an embodiment of pipe coupling support 1300.

Figure 18:
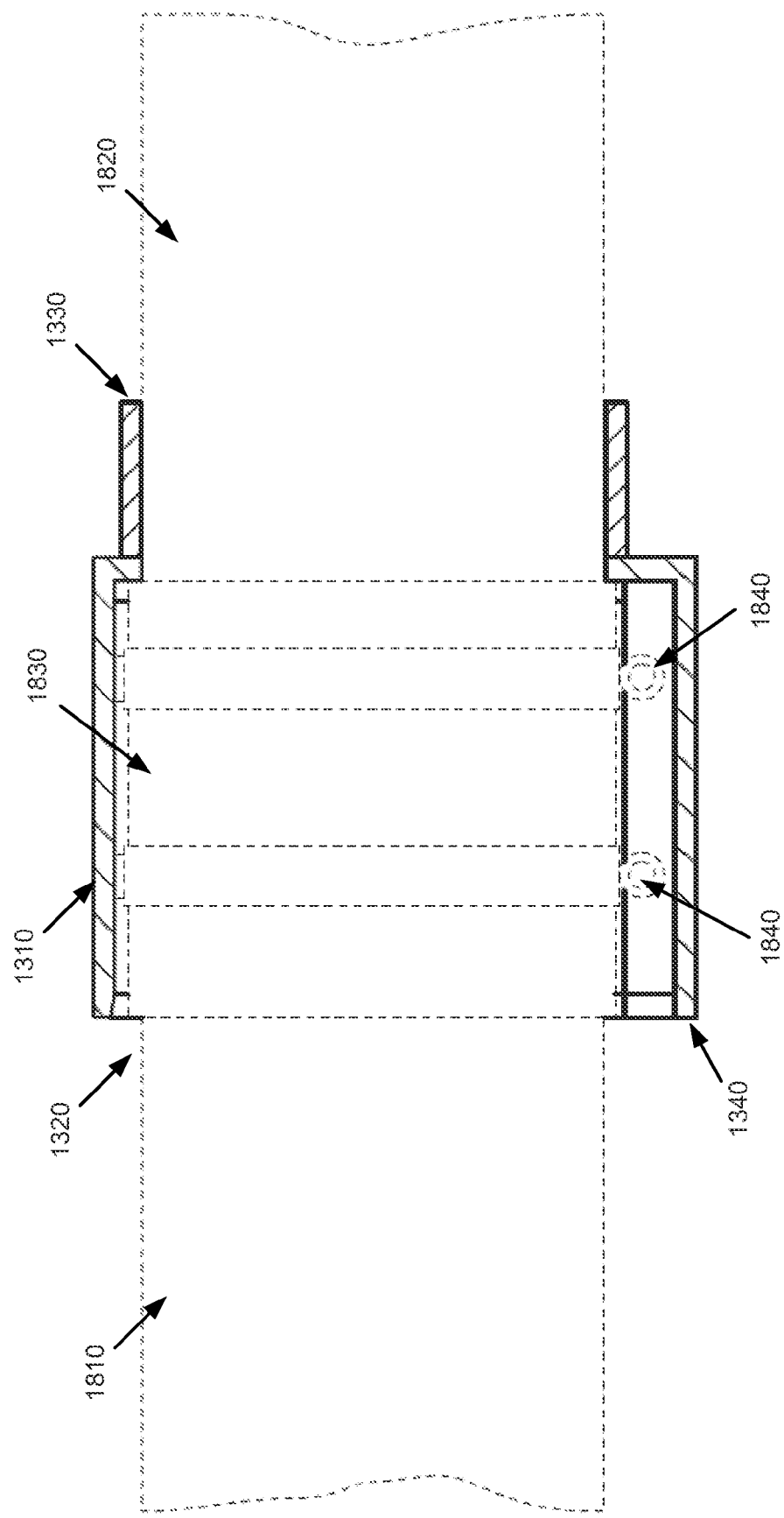
FIG. 18 illustrates an embodiment of a pipe coupling support installed on a pipe coupling assembly.

FIG. 18 illustrates an embodiment of a pipe coupling installed on a pipe coupling assembly. As illustrated in the embodiment of FIG. 18, the pipe coupling support 1300 is designed to support and surround the coupling attaching a first pipe 1810 and a second pipe 1820. In the illustrated embodiment, the first pipe 1810 and the second pipe 1820 are connected with a connection device 1830. In one embodiment, the connection device 1830 may be a support sleeve; however, one of skill in the art will appreciate that various different types of connection devices may be employed with embodiments of the present disclosure. The illustrated embodiment of FIG. 18 also includes two hose clamps having worm drives 1840 used to secure the connection device 1830 to the first pipe 1810 and the second pipe 1820. As shown in FIG. 18, the notch 1340 in the body 1310 of the pipe coupling support 1300 allows for the worm drives which protrude from the surface of the pipe assembly to fit within the pipe coupling support 1300.

Figure 19:
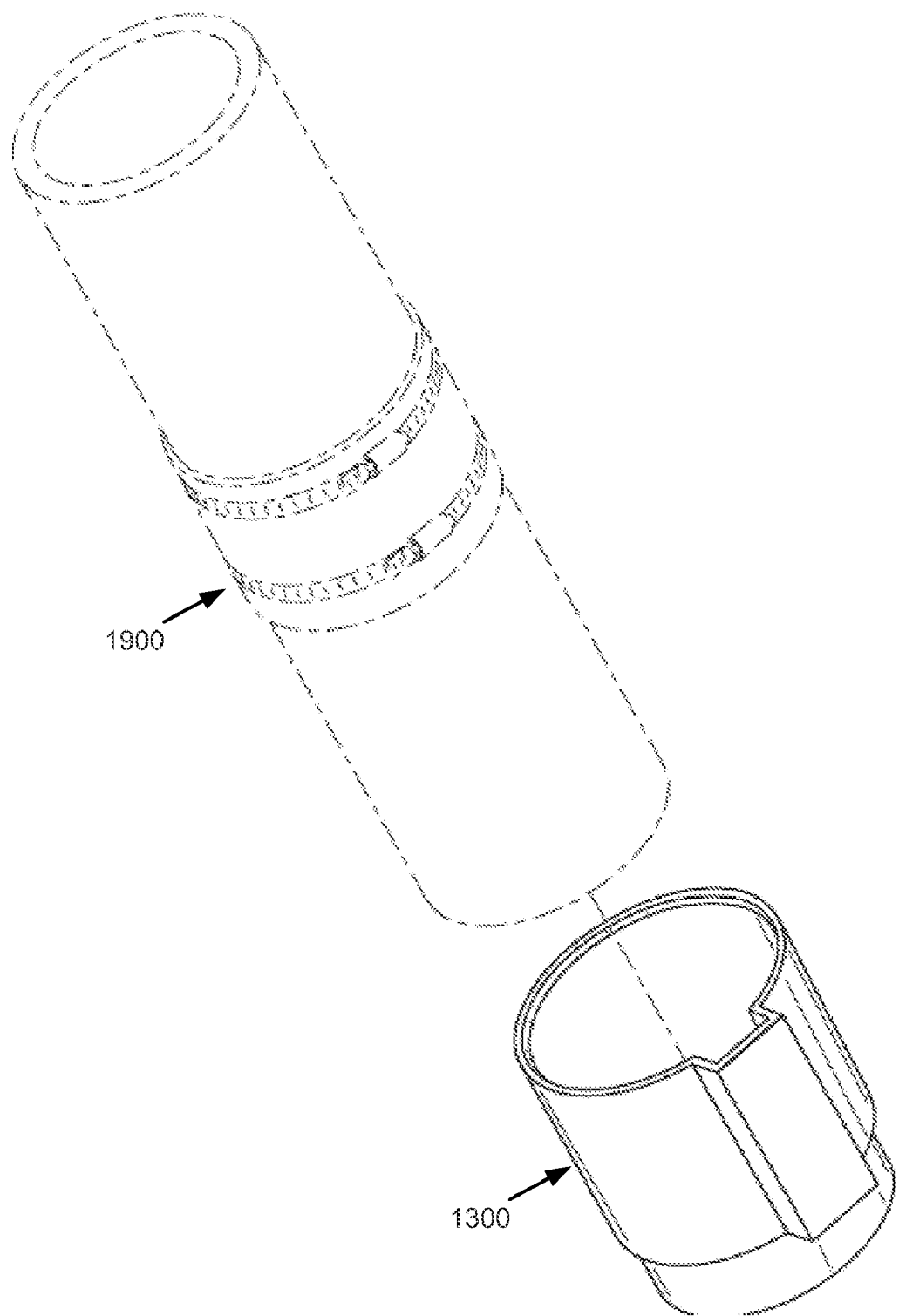
FIG. 19 is an exploded view of an embodiment of a pipe coupling support prior to installment on a pipe coupling assembly.

FIG. 19 is an exploded view of an embodiment of a pipe coupling prior to installment on a pipe coupling assembly. As shown in FIG. 19, the pipe coupling support 1300 is designed to fit over the connection device 1830 used in an installed pipe coupling 1900 to connect a first pipe and second pipe. The pipe coupling support 1300 provides additional support and protection to the coupling materials to secure and protect the connection of the first and second pipe, thus providing a more secure and durable connection between the first and second pipe.

The pipe coupling support embodiments of FIGS. 1-19 described in detail above may be used to provide support and structural rigidity to a new or previously installed pipe coupling. The pipe coupling support may be placed or slid over the existing pipe coupling while making sure that protruding apparatus associated with the coupling such as the worm drive 24 of FIG. 2 are received in the appropriate recesses 42 associated with the pipe coupling support. When properly placed into position, any compression apparatus associated with the pipe coupling support may be tightened assuring close operative engagement between the pipe coupling support and the underlying pipe coupling.

The pipe coupling support may be installed over a pipe coupling immediately after the pipe coupling is installed to join pipe sections. Alternatively, a pipe coupling support may be installed over an existing pipe coupling to repair or reinforce the joint. The substantially rigid body of the various pipe coupling support embodiments described herein greatly increases the ability of a pipe joint joined with a conventional pipe coupling to resist shear forces or tension forces as are commonly encountered when settling occurs.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. For example, a pipe coupling support for a specific set of pipes could be packaged in a kit with the appropriately sized flexible coupling and any necessary hose clamps or attachment devices. Such a kit may include instructions containing photographs or drawings showing proper installation of the support sleeve to connect the pipes using the hose clamps as well as for proper installation of the coupling support to prevent flexing of the flexible coupling. Such a kit could be sold as a repair package for specific nominal pipe size repairs, e.g., a repair package for connecting 4" nominal clay pipe to 4" nominal SCH 40 PVC pipe.

The description of the present invention has been presented for purposes of illustration and description, but is not intended to be exhaustive or limiting of the invention to the form disclosed. The scope of the present invention is limited only by the scope of the following claims. Many modifications and variations will be apparent to those of ordinary skill in the art. The embodiment described and shown in the figures was chosen and described in order to best explain the principles of the invention, the practical application, and to enable others of ordinary skill in the art to understand the invention for various embodiments with various modifications as are suited to the particular use contemplated.

What is claimed is:

1. A pipe coupling support for supporting an installed pipe coupling when connecting a first pipe and a second pipe having the substantially the same exterior diameter, the pipe coupling support comprising:
    a body comprising:
        a first opening, wherein the first opening has an interior diameter sized to receive an exterior diameter of the installed pipe coupling when connecting the first pipe and the second pipe;
        a second opening, wherein the second opening has an interior diameter sized to receive the exterior diameter of the first or second pipe; and
        a covered notch in the first opening, wherein the covered notch is sized to receive a compression apparatus.

2. The pipe coupling support of claim 1, wherein the body is fabricated from a rigid material.

3. The pipe coupling support of claim 1, wherein the rigid material comprises at least one of:
    polyvinyl chloride ("PVC"); and
    acrylonitrile butadiene styrene ("ABS").

4. The pipe coupling support of claim 1, wherein the body is fabricated from a pliable material.

5. The pipe coupling support of claim 1, wherein the pipe coupling support is sized to fit a nominal size of SDR 26 pipe.

6. The pipe coupling support of claim 1, wherein the pipe coupling support is sized to fit a nominal size of SDR 35 pipe.

7. The pipe coupling support of claim 1, wherein the pipe coupling support is sized to fit a nominal size of SCH 40 pipe.

8. The pipe coupling support of claim 1, further comprising one or more inner supports.

9. A pipe coupling support comprising:
    a circumferentially uninterrupted rigid body comprising:
        a first opening having a first interior diameter, the first opening comprising a covered notch for providing space for one or more worm drives and wherein the first interior diameter is sized to receive an installed pipe coupling connecting a first pipe having a first exterior diameter to a second pipe having the first exterior diameter; and
        a second opening having a second interior diameter, the second interior diameter different from the first, wherein the second interior diameter is sized to receive the first exterior diameter.

10. The pipe coupling support of claim 9, wherein the first pipe and the second pipe have a same nominal size.

11. The pipe coupling support of claim 9, wherein the rigid body is fabricated from one of:
    polyvinyl chloride ("PVC"); and
    acrylonitrile butadiene styrene ("ABS").

12. A kit comprising:
    a flexible coupling sized to for connecting two pipes of nominal size;
    at least one attachment device for installing the flexible coupling on to the two pipes so as to connect the pipes; and
    a pipe coupling support comprising:
        a body with
            a first opening, wherein the first opening has an interior diameter sized to receive an exterior diameter of the flexible coupling when connecting the first pipe and the second pipe;
            a second opening, wherein the second opening has an interior diameter sized to receive the exterior diameter of the first or second pipe; and
            a covered notch in the first opening, wherein the covered notch is sized to receive a compression apparatus.

13. The kit of claim 12 wherein the at least one compression apparatus comprises a hose clamp and the notch is sized to pass a worm drive attached to the hose clamp.

* * * * *